(12) United States Patent
Chen et al.

(10) Patent No.: US 7,648,633 B2
(45) Date of Patent: Jan. 19, 2010

(54) HOLLOW FIBRE MEMBRANE MODULE WITH A FIXED STRUCTURE

(75) Inventors: Lianggang Chen, Shanghai (CN); Man Chen, Shanghai (CN); Qing Chen, Shanghai (CN)

(73) Assignee: Shanghai Litree Purifying Equipment Co., Ltd., Shanghai (CN)

( * ) Notice: Subject to any disclaimer, the term of this patent is extended or adjusted under 35 U.S.C. 154(b) by 0 days.

(21) Appl. No.: 12/211,153

(22) Filed: Sep. 16, 2008

(65) Prior Publication Data

US 2009/0071894 A1    Mar. 19, 2009

Related U.S. Application Data

(63) Continuation of application No. PCT/CN2007/000040, filed on Jan. 8, 2007.

(30) Foreign Application Priority Data

Mar. 16, 2006    (CN) .................... 2006 2 0040234 U

(51) Int. Cl.
*B01D 63/02*    (2006.01)
*B01D 35/30*    (2006.01)

(52) U.S. Cl. .............. 210/321.81; 210/321.6; 210/321.79; 210/321.8; 210/321.88; 210/321.89; 210/321.9; 210/500.23

(58) Field of Classification Search .............. 210/321.6, 210/321.79, 321.8, 321.81, 321.88, 321.89, 210/321.9, 441, 500.23
See application file for complete search history.

(56) References Cited

U.S. PATENT DOCUMENTS

| 4,220,535 A | * | 9/1980 | Leonard ................ 210/321.89 |
| 4,720,342 A | * | 1/1988 | Takemura et al. ...... 210/321.79 |
| 7,160,455 B2 | * | 1/2007 | Taniguchi et al. ...... 210/321.88 |
| 2009/0050555 A1 | * | 2/2009 | Baba et al. ............. 210/321.69 |

FOREIGN PATENT DOCUMENTS

| CN | 2485293 | 4/2002 |
| CN | 2744398 | 12/2005 |

* cited by examiner

*Primary Examiner*—John Kim
(74) *Attorney, Agent, or Firm*—Hamre, Schumann, Mueller & Larson, P.C.

(57) ABSTRACT

A hollow fiber membrane module with a fixed structure comprises: a bearing shell (7), an inlet (8), a concentrated water outlet (10), a produced water outlet (9), a central tube (1) and hollow fiber membranes (6), in which the hollow fiber membranes (6), the central tube (1) and the bearing shell (7) are fixed together, the inlet (8) is located at one end of the hollow fiber membranes (6), the concentrated water outlet (10) is located at the other end of the hollow fiber membranes (6), the produced water outlet(s) (9) is(are) located at one end or both ends of the central tube (1), and there are small holes drilled on the side wall of the central tube (1). The module also comprises at least one separate fixed ring(s) (2) for fixing the hollow fiber membranes (6), with the separate fixed ring(s) (2) fixed on the central tube (1) and the hollow fiber membranes (6) arranged in parallel through the separate fixed ring(s) (2).

10 Claims, 2 Drawing Sheets

HOLLOW FIBRE MEMBRANE MODULE WITH A FIXED STRUCTURE

CROSS-REFERENCE TO RELATED APPLICATIONS

This application is a continuation of International Patent Application No. PCT/CN2007/000040, filed on Jan. 8, 2007, which claims priority to Chinese Patent Application No. 200620040234.X, filed on Mar. 16, 2006, the entire contents of both of which are incorporated herein by reference.

FIELD OF THE INVENTION

The present invention relates to a filtrating equipment, more specifically, to a hollow fibre membrane module with a fixed structure.

BACKGROUND OF THE INVENTION

Hollow fibre membranes have been widely used in the fields such as water treatment, biological separation and air filtration. The typical manner for constructing a hollow fibre membrane module is to amount a bundle of hollow fibre membranes into a bearing shell, then fix the ends of the bundle. However, such manner of directly amounting the bundle into a shell easily causes the fibre membranes knotted and disordered.

The directly fixed membrane module has been improved. Some improvement are to cover a net-like protection layer on the bundle, and others are to separate the membranes into several bundles with separators. Although the above improvements have a certain protection effect on the membranes, they easily damage the bundles, and cannot well solve the problems existing in the distribution of water stream and collection of the produced water, which tend to resulting the breaking of the membranes and the low filtrating efficiency. When the diameter and the length of the membrane module are larger, the above problems are more obvious.

To solve the above problems, someone have proposed to add a water distributing device at the end of the bundle, so as to distribute water, and fix the water distributor, bundle and shell together through bonding. However, this method still has the problem of nonuniform water distribution.

Consequently, there is an urgent need to develop a hollow fibre membrane module with a reasonable structure, which has more reasonable and efficient water stream distribution and produced water collection, improved hollow membranes availability, and higher filtration efficiency.

SUMMARY OF INVENTION

The present invention has solved the problems existing in the prior art by incorporating a fixing structure into the hollow fibre membrane module.

In one aspect, the present invention provides a hollow fibre membrane module with a fixed structure comprising: a bearing shell, an inlet, a concentrated water outlet, a produced water outlet, a central tube and hollow fibre membranes, in which the hollow fibre membranes, the central tube and the bearing shell are fixed together, the inlet is located at one end of the hollow fibre membranes, the concentrated water outlet is located at the other end of the hollow fibre membranes, the produced water outlet(s) is(are) located at one end or both ends of the central tube, and there are small holes drilled on the sidewall of the central tube, wherein the module also comprises at least one separate fixed ring(s) for fixing the hollow fibre membranes, with the separate fixed ring(s) fixed on the central tube and the hollow fibre membranes arranged in parallel through the separate fixed ring(s).

In a preferred embodiment, when one separate fixed ring is used, it is located at the middle of the central tube; and when more separate fixed rings are used, they are arranged in equi-distance on the central tube.

In another preferred embodiment, both ends of the hollow fibre membranes are integrated with the central tube through a bonding material, then inserted into the bearing shell.

In another preferred embodiment, the hollow fibre membranes, the central tube and the bearing shell are directly integrated through a bonding material.

In another preferred embodiment, an outer ring is located at the outer edge of the separate fixed ring, an inner ring is located at the inner of the separate fixed ring, and many radial rib plates are located between the outer ring and the inner ring in equidistance; and, the hollow fibre membranes are mounted in a cyclic space formed by the outer ring, the inner ring and the radial rib plates of the separate fixed ring in equal amount, and are parallel with the central tube.

In another preferred embodiment, there is a through-hole in the outer ring; the inner ring is fixed in the central tube; the radial rib plate has a length of no less than 5 mm, a width of no less than 2 mm and a thickness of no less than 2 mm; and when more separate fixed rings are used, the radial rib plate corresponding to each separate fixed ring is distributed on the same plane.

In another preferred embodiment, wherein the outer ring and the radial rib plate are integrated.

In another preferred embodiment, the outer ring has many separating bodies respectively inserted into the radial rib plate, and the amount of the separating bodies is at least 2, and at most equal to the amount of the radial rib plate.

In another preferred embodiment, the separating bodies and the radial rib plate are bonded together, or the separating bodies and the radial rib plate are clipped together, and the separating bodies can be separated from the radial rib plate.

In another aspect, the present invention provides a filter comprising the above hollow fibre membrane module.

DETAILED DESCRIPTION OF INVENTION

Through extensive and intensive investigation, the inventors of the present invention have found that by incorporating a fixing structure such as a separate fixed ring into the hollow fibre membrane module, a hollow fibre membrane module with a reasonable structure, which has more reasonable and efficient water stream distribution and produced water collection, improved hollow membranes availability, and higher filtration efficiency, can be obtained. Based on the above finding, the present invention has been achieved.

Now, the present invention is further described in conjunction with the drawings. However, it should be understood that these drawings are merely to illustrate the present invention, not limiting the scope of the invention.

Figure 1:
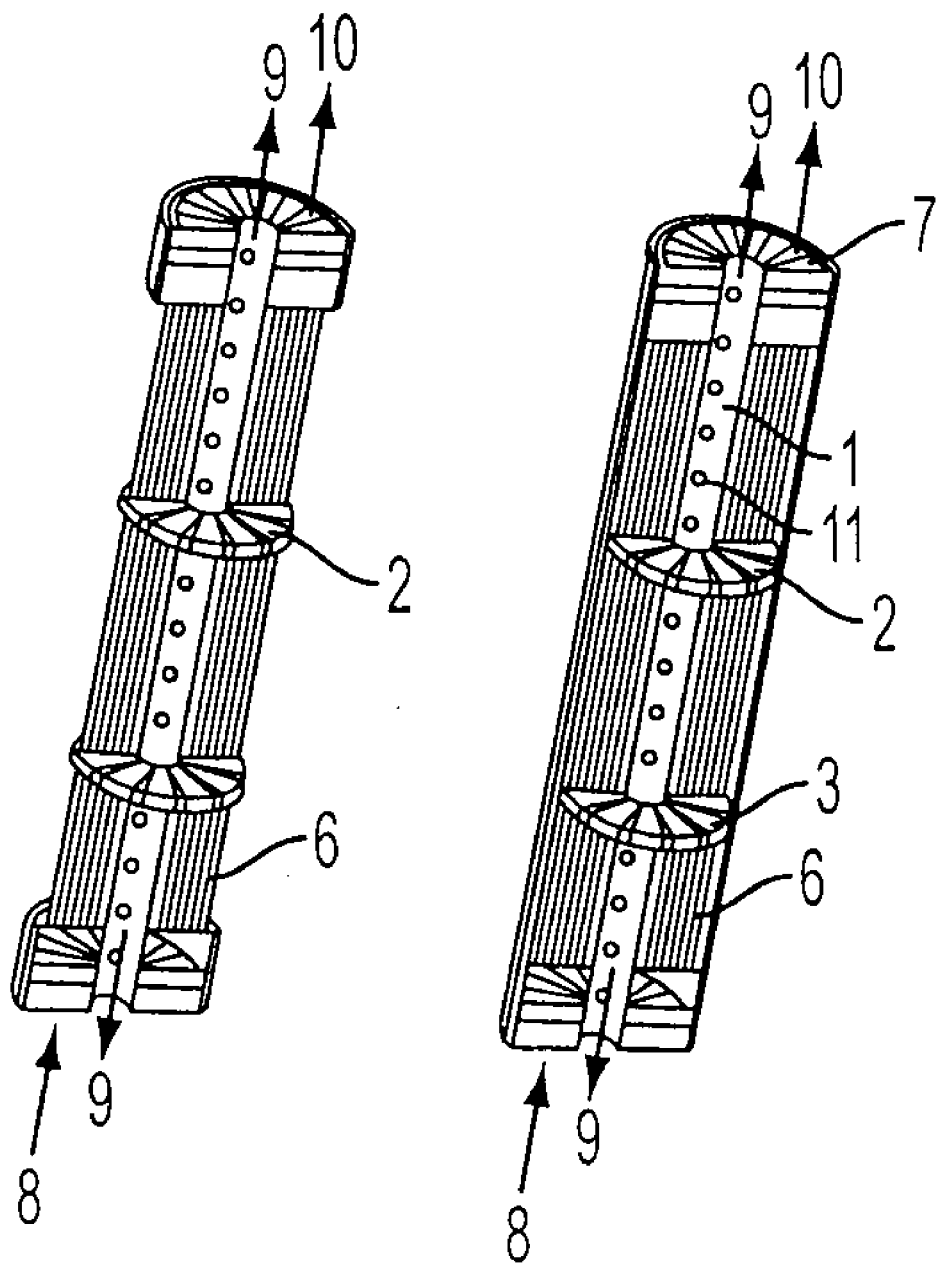
FIG. 1 is a sectional view of the hollow fibre membrane module with a fixed structure according to a preferred embodiment of the present invention.

FIG. 1 is a sectional view of the hollow fibre membrane module with a fixed structure according to a preferred embodiment of the present invention. As illustrated in FIG. 1, the hollow fibre membrane module is a cylinder structure. The central tube 1 is also a cylinder, and there are small holes 11 drilled on the outer wall thereof. The separate fixed rings 2 are distributed in equidistance on the central tube 1 for separating and fixing the hollow fibre membranes 6. The radial rib plates 3 corresponding to each separate fixed ring 2 forms a plane along the axis of the central tube 1. The hollow fibre membranes 6 are also in the form of cylinder and parallel with the central tube 1, and the ends thereof and the central tube 1 are fixed together. These hollow fibre membranes 6 are arranged in parallel through the separate fixed rings 2. The above member composed of the central tube 1, the hollow fibre membranes 6 and the separate fixed rings 2 are inserted into the bearing shell 7, so as to seal the outer edge of the ends of the membranes and the bearing shell 7. In another embodiment, the ends of the membranes, the central tube 1 and the bearing shell 7 can be directly integrated with a bonding material. In another embodiment, when only one separate fixed ring 2 is used, it is located at the middle of the central tube 1.

The operation principle of the hollow fibre membrane module is as follows: when the ultrafiltration membrane is an internal pressure membrane, raw water flows into the inlet 8 located at one end of the hollow fibre membranes 6, then the filtrated produced water flows into the central tube 1 via the through-hole on the central tube 1 through the space between the bundle, and flows out of the produced water outlets 9 on both ends of the central tube 1; and, the raw water without being filtrated flows into the other end of the membranes 6 via the inner side of the membranes, so as to form concentrated water and flow out of the concentrated water outlet 10, wherein the produced water outlet 9 can be located at one end of the central tube 1 only; and, when the ultrafiltration membrane is an external pressure membrane, the inlet 8 and the concentrated water outlet 10 become the produced water outlets, and the produced water outlet 9 becomes an aeration outlet, thus the produced water flows out of the inlet 8 and the concentrated water outlet 10 via the outer sides of the membranes.

Figure 2:
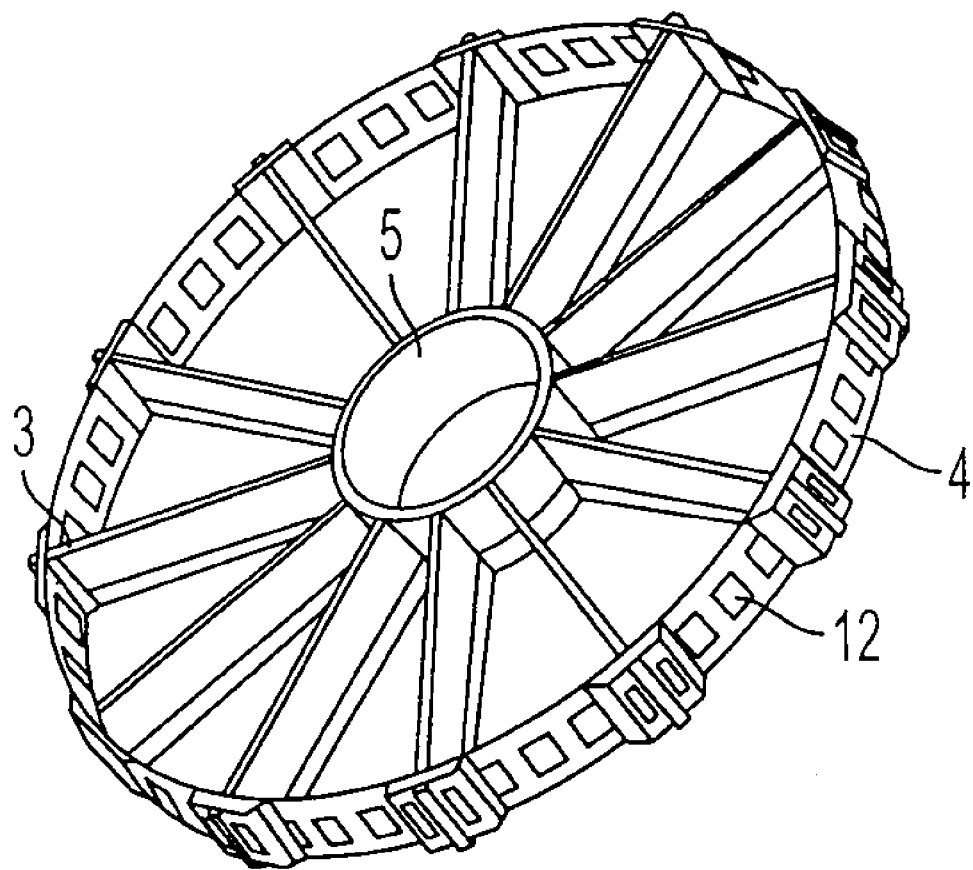
FIG. 2 illustrates the structure of the separate fixed ring in the preferred embodiment according to FIG. 1.

FIG. 2 illustrates the structure of the separate fixed ring 2 in the preferred embodiment according to FIG. 1. As illustrated in FIG. 2, the separate fixed ring 2 is composed of an outer ring 4, an inner ring 5, and radial rib plates 3 located between the outer ring and the inner ring in equidistance. There are many through-holes 12 on the outer ring 4, the inner ring 5 is fixed on the central tube 1, and the radial rib plate 3 has a length of no less than 5 mm, a width of no less than 2 mm and a thickness of no less than 2 mm, generally. When mounting, the outer ring 4 and the radial rib plates 3 can be integrated, or the outer ring can be formed into many separating bodies respectively inserted into the radial rib plates 3. The amount of the separating bodies is at least 2, and at most equal to the amount of the radial rib plates 3. The separating bodies and the radial rib plates 3 can be bonded together, or the separating bodies and the radial rib plates 3 can be clipped together, and the separating bodies can be easily separated from the radial rib plates 3. The hollow fibre membranes are mounted in a cyclic space formed by the outer ring 4, the inner ring 5 and the radial rib plates 3 of the separate fixed ring in equal amount.

The main advantages of the present invention are as follows:

The separate fixed ring fixes the bundle, correspondingly separates the bundle, and forms a channel between the bundle, thus greatly reducing the resistance of the membranes against water stream. Raw water flows into the inlet, then penetrates through the wall of the hollow membranes to form produced water, while raw water flows to the other end of the inner wall of the membranes to form concentrated water. Through the above channel formed by the separate fixed rings, the produced water can flow into the produced water outlet without being blocked, and the concentrated water can be discharged from the concentrated water outlet, thus greatly increasing the operating efficiency of the membranes. Therefore, when the diameter and the length of the membrane module are larger, the configuration of the present invention can still remain the ordered arrangement of the membranes and the high efficient operation, thus ensuring the collection and flow of the produced water.

Although the present invention has been illustrated in detail for the purpose of clarity and understanding, upon reviewing the description of the present application, those skilled in the art will readily understand that various amendments and modifications can be made in the present invention without departure of the spirit and substance of the present invention. Such amendments and modifications fall within the scopes of the attached claims and their equivalents.

What is claimed is:

1. A hollow fibre membrane module with a fixed structure comprising: a bearing shell, an inlet, a concentrated water outlet a produced water outlet, a central tube and hollow fibre membranes, in which the hollow fibre membranes, the central tube and the bearing shell are fixed together, the inlet is located at one end of the hollow fibre membranes, the concentrated water outlet is located at the other end of the hollow fibre membranes, the produced water outlet(s) is(are) located at one end or both ends of the central tube, and there are small holes drilled on the side wall of the central tube, wherein the module also comprises at least one separate fixed ring(s) located inside the module for fixing the hollow fibre membranes, with the separate fixed ring(s) fixed on the central tube and the hollow fibre membranes arranged in parallel through the separate fixed ring(s) wherein an outer ring is located at the outer edge of the separate fixed ring, an inner ring is located at the inner of the separate fixed ring, and many radial rib plates are located between the outer ring and the inner ring in equidistance; and the hollow fibre membranes are mounted in a cyclic space formed by the outer ring, the inner ring and the radial rib plates of the separate fixed ring in equal amount, and are parallel with the central tube.

2. The hollow fibre membrane module according to claim 1, wherein when one separate fixed ring is used, it is located at the middle of the central tube; and when more separate fixed rings are used, they are arranged in equidistance on the central tube.

3. The hollow fibre membrane module according to claim 1, wherein both ends of the hollow fibre membranes are integrated with the central tube through a bonding material, then inserted into the bearing shell.

4. The hollow fibre membrane module according to claim 1, wherein the hollow fibre membranes, the central tube and the bearing shell are directly integrated through a bonding material.

5. The hollow fibre membrane module according to claim 1, wherein there is a through hole in the outer ring; the inner ring is fixed in the central tube; the radial rib plate has a length of no less than 5 mm, a width of no less than 2 mm and a thickness of no less than 2 mm; and when more separate fixed rings are used, the radial rib plate corresponding to each separate fixed ring is distributed on the same plane.

6. The hollow fibre membrane module according to claim 1, wherein the outer ring and the radial rib plate are integrated.

7. The hollow fibre membrane module according to claim 1, wherein the outer ring has many separating bodies respectively inserted into the radial rib plate, and the amount of the separating bodies is at least 2, and at most equal to the amount of the radial rib plate.

8. The hollow fibre membrane module according to claim 7, wherein the separating bodies and the radial rib plate are bonded together, or the separating bodies and the radial rib plate are clipped together, and the separating bodies can be separated from the radial rib plate.

9. A filter comprising the hollow fibre membrane module according to any one of claims 1-4 and 5-8.

10. The hollow fibre membrane module according to claim 1, wherein the at least one separate fixed ring(s) located inside the module forms a channel for the produced water to flow into the produced water outlet(s).

* * * * *